Feb. 11, 1969  M. JUSTINIEN  3,426,721

ROTARY HELICAL BODY ADAPTED FOR USE ON BOARD WATER CRAFTS

Filed Nov. 21, 1966

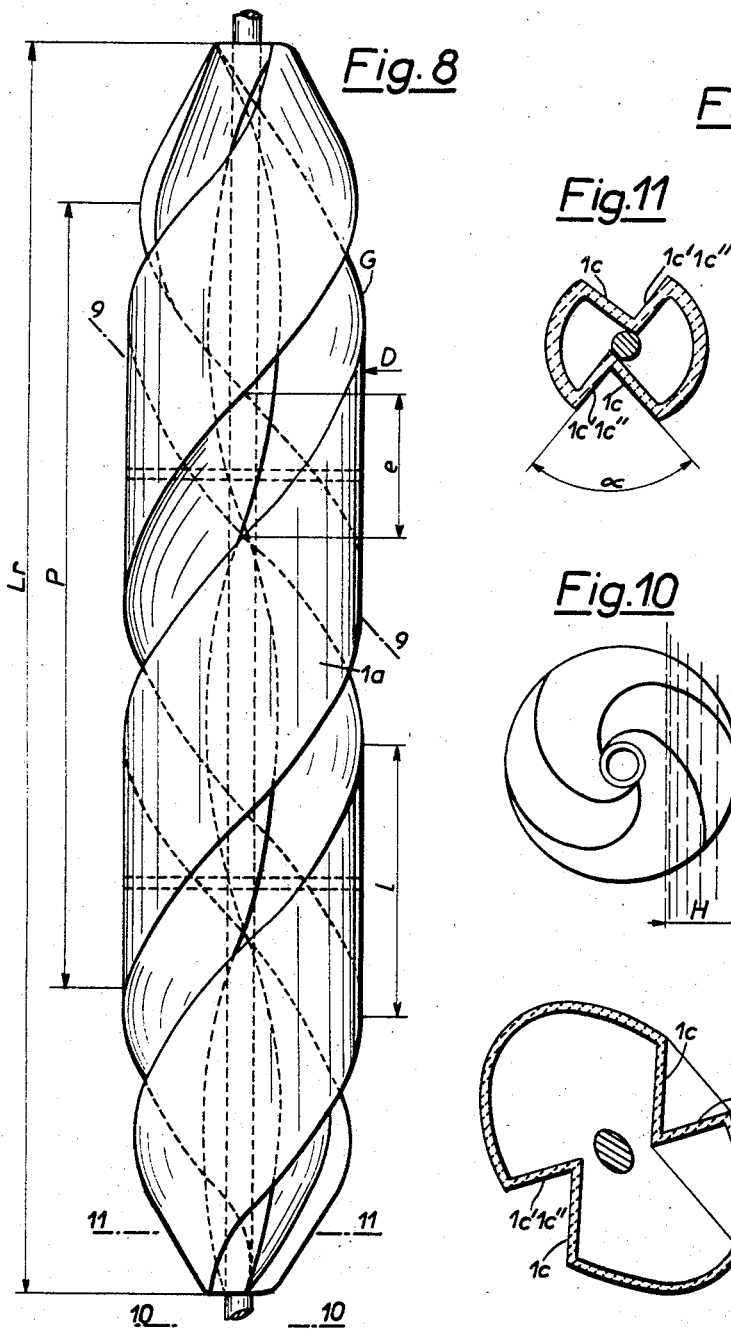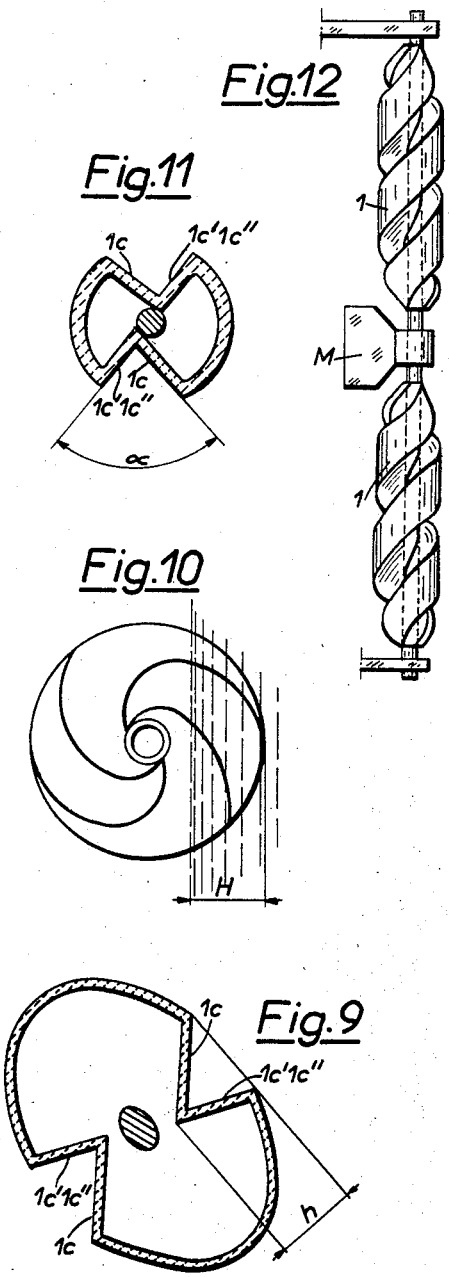

United States Patent Office 3,426,721
Patented Feb. 11, 1969

3,426,721
ROTARY HELICAL BODY ADAPTED FOR USE ON BOARD WATER CRAFTS
Marcel Justinien, 20 bis Rue Jouvenet, Paris 16ᵉ, France
Filed Nov. 21, 1966, Ser. No. 595,874
Claims priority, application France, Nov. 30, 1965, 9,331
U.S. Cl. 115—19
Int. Cl. B63h *1/00;* B60f *3/00*
21 Claims

ABSTRACT OF THE DISCLOSURE

A floating member comprising a helicoidal winding with adjacent turns connected together to define a hollow body of generally cylindrical shape with closed ends. The body has an enclosed interior space which is continuous within the bounds of the helicoidal winding.

---

Figure 1:
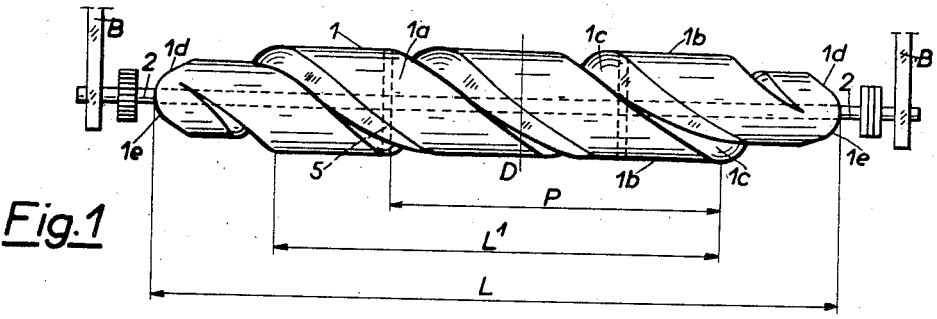

Various rotary helically shaped buoyancy devices have been developed for ensuring both the buoyancy and the propulsion of ships or the like water craft. The known devices have generally not led to industrial use and operation, and although tests show a sufficiently high efficiency, various problems as to buoyancy, stability and draught are present, as regards size and shape in relation to the necessity of obtaining a sufficiently deep immersion into the water to produce maximum thrust and a minimum wash and drag. The solution of such problems is essential and my invention has in fact for its object an arrangement which is well-defined and provides the desired solution of said problems in an efficient manner leading to practical and commercial applications in the field considered. Thus, a true technical improvement is obtained, which is beyond purely theoretical unreliable and fruitless designs which cannot satisfy industrial requirements.

My improved rotary floating body or buoyancy device is designed with shaped ends and with an outer surface formed by large and broad hollow flanges or turns of a helicoidal winding which ensures propulsion and buoyancy. Said helical winding has a gradual reduction in diameter along a spiral line at each end of the floating body, whereas the winding has a uniform breadth throughout the length of the body including the spirally reduced portions at each end of the floating body. The sum of the breadth of said turns considered at their outer surfaces as measured along the axis of the body is equal to 45 to 55% of the total length of the body.

According to a further feature of my invention, the floating body has a relationship between total length and maximum diameter ranging between 1/6 and 1/7 according to the nature of the water craft to be equipped therewith, its applications and the nature of the material used for the construction of the buoyancy device or floating body. The pitch of the turns of the helical winding may vary between 2.8 and 4 times the maximum diameter of the floating body, while the winding is spirally wound at the ends of the body over about the length of one pitch.

According to a still further object of my invention, a gap or groove between two adjacent flanges or turns has a cross-section of triangular shape, while the height of the triangular cross-section may be equal to 30 to 35% of the maximum diameter of the body and the length of the base of said triangular cross-section may be about 50% of said maximum diameter according to the value chosen for the pitch of the helical flanges referred to hereinabove.

According to yet another feature of my invention, the slopes of the sides of the triangular cross-section of the groove between two adjacent flanges may be given different values.

According to a still further feature of the invention, platforms forming water-arresting and shock-absorbing screens are suitably carried above the rotary helical floating bodies.

Investigations and calculations executed with such an arrangement and relating in particular to the resistance to the unequal pressures of water on the different parts have led to propose, according to a modified embodiment, size ratios with reference to the maximum diameter which are modified with a view to equipping water craft for which the speed of propulsion is the primary purpose and obviously the features of the helical floating body disclosed first hereinabove retain their interest for the execution of water crafts wherein this necessity of a high speed is no longer essential.

Figure 2:
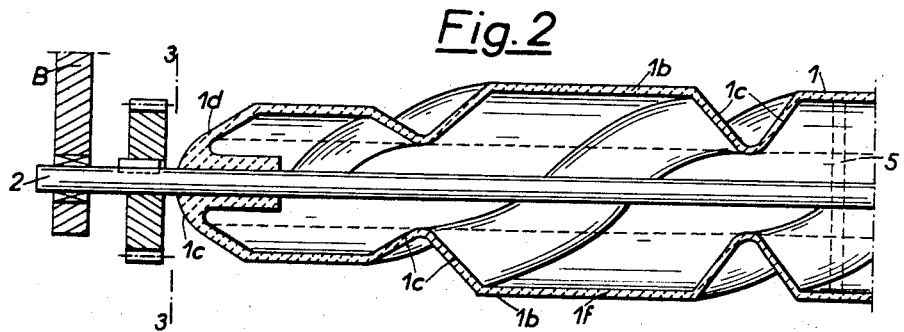
Figure 3:
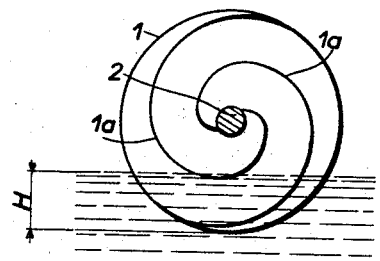
Figure 4A:
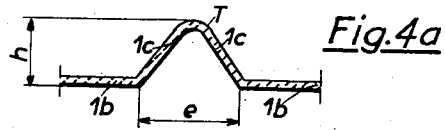
Figure 4B:
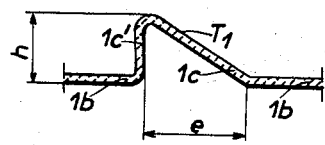
Figure 4C:
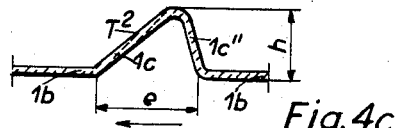
Figure 5:
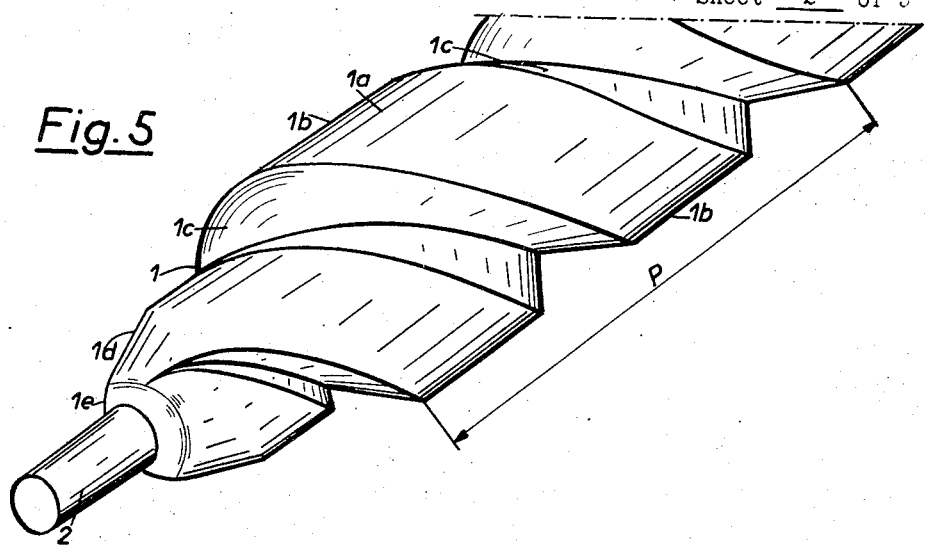
Figure 6:
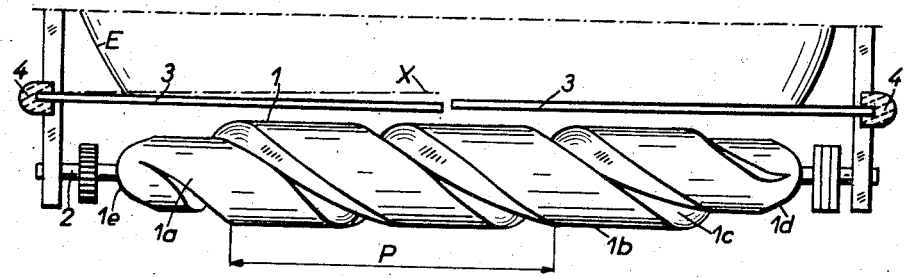
Figure 7:
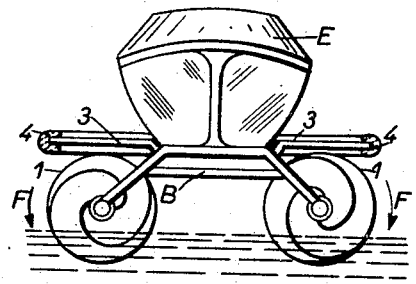

In order to more clearly disclose my invention, I have illustrated two embodiments thereof by way of mere examples in the accompanying drawings, wherein:

FIG. 1 is a side elevation view of a first embodiment of my improved rotary helical floating body, FIG. 2 is on a larger scale an axial sectional view of one end of the same rotary helical floating body, FIG. 3 is an end view of the body as seen along line 3—3 of FIG. 2, FIGS. 4*a*, 4*b* and 4*c* show on a larger scale longitudinal partial cross-sections illustrating various shapes of the triangular cross-section of the groove separating two successive helical flanges, FIG. 5 is a perspective view on a larger scale of one end of a rotary helical floating body of the type illustrated in FIG. 1, FIGS. 6 and 7 are respectively a side view and a front view on a larger scale of deflecting platforms equipping a water craft provided with a rotary helical floating body, said craft being obviously illustrated only by way of example, FIG. 8 is a side view of a rotary helical floating body according to a modification of the invention.

FIG. 9 is a cross-section taken along line 9—9 of FIG. 8 extending perpendicularly to the groove formed between two successive flanges, FIG. 10 is an end view of the floating body as seen in the direction of the arrow 10—10 in FIG. 8, FIG. 11 is a transverse cross-section through line 11—11 of FIG. 8 near one end of the floating body, perpendicularly to the axis of the latter, and FIG. 12 shows on a smaller scale and in diagrammatic side view the assembly of two floating bodies in axial alignment with an intermediate motor driving them and fitted between them.

In order to make the invention more readily understandable, reference will now be made to the different figures of the drawings showing the features of said invention.

The properties to be given to a water craft provided with a rotary helical floating body and its possible speed of progression depend strictly on the necessity of obtaining a minimum draught for a maximum immersed volume, while its peripheral outline, including projections, ensures a maximum propelling thrust together with a minimum braking of its progression.

To this end, my improved rotary helical floating body is designed generally as a hollow cylinder designated by the reference number 1 in the drawings. Said floating body is shaped primarily with hollow flanges 1*a* extending at the periphery of the body 1 in the form of turns of a helicoidal winding, the pitch of which is equal to P. Said floating body ensures on the one hand the buoyancy and on the other hand the propulsion of the water craft equipped with a number of such floating bodies. Generally, two parallel bodies or two parallel groups of bodies each including two axially aligned floating bodies are used.

The length L of the body 1 is defined as a function of the maximum diameter D of the propelling and floating body. Said length may vary with reference to said diameter D, the ratio $L/D$ ranging between 6 for light weight water craft which are not intended for high speed performance and 7 for water crafts adapted to execute high speed performance or to resist large unequally distributed thrusts. Such ratios, when large, reduce the longitudinal resistance opposing progression and it is possible to reinforce the floating body in such a case by means of a central cylinder as shown in interrupted lines in FIG. 2. Such ratios varying from 6 to 7 between the maximum diameter D of the floating body and its length L are to be preferred and adopted so as to ensure a larger longitudinal rigidity for the floating body, together with a high resistance against the torsional stresses and unequally distributed thrusts to which it may be subjected. It should also be remarked that the ratio between the maximum diameter D of the floating body and its length L depends also on the material selected for executing such a floating body, which material may be steel, a light alloy, plastics, an inflatable casing or the like according to the properties required in conformity with the proposed application of the water craft to be equipped.

According to an interesting feature of my invention, a predetermined ratio which is equal at a maximum to ¼ of the diameter of the floating body defines the height H of the draught (FIG. 3) which is to be obtained when the water craft is under normal load. Said draught depends directly on the immersed volume of the floating body which is to correspond substantially to ⅛ of the total volume of said floating body.

Said ratio of ¼ between the draught and the diameter of the floating body is obtained by taking into account first the diameter D of the floating body and secondly the number and breadth of the helical flanges, chiefly the total length of the immersed flanges. All these sizes are directly interrelated and they also form the basic data limiting the immersed height substantially to ¼ of the maximum diameter of the floating body the immersed volume corresponding substantially to $\frac{1}{7.5}$ or ⅛ of the volume of a circular cylinder the diameter and length of which are equal to the maximum diameter and to the length of the helical floating body respectively.

The floating body 1 is provided with the number of helical flanges required for satisfying the conditions referred to and for obtaining the desired results. Although this number of helical flanges increases the tangential resistance and reduces thereby the maximum possible speed of the craft, nevertheless the penetration through the water mass is improved, whereby a higher resistance is obtained against torques to which the floating body is subjected at the start of movement the water craft or when said floating body serves as a propelling means. The number of helical flanges varies with the intended use of the water craft equipped with propelling and floating bodies according to the invention. Thus, for a high speed craft the number of helical flanges may be reduced to two, whereas for a craft which is to overcome a high inertia at each start, or is to undergo frequent stoppage and starts, the number of helical flanges may range between three and six for instance. It is even possible, in conformity with a limit arrangement, to provide the floating body with a single helical flange. On the other hand, the helical pitch of the flange 1a varies according to the intended use of the corresponding water craft in a ratio ranging between 2.6 and 4 times the diameter of the floating body. Said pitch which depends also on the number of helical flanges and on the spacing between the latter cooperates in providing the craft with the desired properties in operation.

To this end, a change speed gear with a number of driving ratios between the engine and the floating body is fitted in a manner such as to ensure the drive of the floating body or bodies under optimum conditions for the different stages of operation.

The cross-section of the helical flanges assumes a trapezoidal outline the small base of which forms part of the peripheral water-engaging bearing surface 1b of which the generating line is parallel with the axis of the floating body. To each side of said surfaces 1b, the sloping sides 1c of the latter form between any two successive flanges or turns a depressed area of V-shape which forms triangular cross-section wherein the water exerts the desired craft-propelling thrust. As seen in FIG. 2 the flanges or turns of the winding define the body 1 which is of hollow self-contained monolithic construction. The interior space in the body is enclosed and is continuous within the bounds of the turns of the winding.

The breadth of the surface 1b of the flanges is defined accurately since it forms a basic element governing directly the height of the draught, as also the buoyancy and efficiency of the craft. It will be readily understood that the breadth of said outer surface 1b of the helical flanges varies with the intended use of the water craft carried by the floating body, with the diameter of the floating body, with the number of flanges, with the helical pitch and lastly with the volume of the floating body and its weight and the material used for its execution.

However, according to a further object of the invention, said breadth of the surface 1b is the same for all the flanges or turns and is constant and uniform throughout the length of the floating body. However, at the beginning and end of each flange, its ridges are rounded so as to retain the same pitch in the terminal spirally deformed helical sections of the extreme flanges and their purely helical sections. The sum of the breadths of the surfaces 1b which are immersed and are defined by the dimension L1 in FIG. 1 is calculated accurately, since it forms a basic element which allows estimating the lifting force and also ascertaining the draught of the immersed volume. To this end, said total length L1 is defined by a ratio ranging between about 45 and 55% of the total length of the floating body. Said limit proportions should be complied with watever may be the number of helical flanges.

As a modification, a short triangular projection 1f is provided on the surface 1b as shown in interrupted lines in FIG. 2 and its ridge increases the engagement between the floating body and water in the case of a self-floating body, while the speed of rotation is caused thereby to correspond with the speed of progression in the case of freely revolving floating bodies, in order to eliminate or reduce any slip.

The grooves having a triangular cross-section formed between the helical flanges 1a are subjected through their sloping sides 1c to the thrust of water, which leads to a propulsion of the water craft. For this reason, the triangular outline of the cross-section may be modified according to the intended use of the water craft carried by the floating body or bodies. I have illustrated by way of example in FIG. 4 three different triangular cross-sectional outlines which may be obtained between two adjacent helical flanges.

The first outline T has substantially the shape of an isosceles triangle the height h of which may be equal to about ⅓ of the diameter of the floating body with a base e which when measured between the outer ends of the sides 1c may be equal to about ½ of the diameter D of the floating body. The oblique sides 1c are equal and their slopes are also equal.

The cross-sectional outline T1 corresponds to a cross-section which approximates that of a right-angled triangle, the rear side of one flange being radial and extending perpendicular to the water level. Such a cross-sectional outline is of particular interest in association with a self-propelling water craft wherein the floating body is driven by a power unit or by manual effort.

Lastly, the cross-sectional outline T2 is symmetrical to the outline T1 since its radial side extending perpendicularly to the water level is constituted by the rear side 1c' of one adjacent flange. Such an outline is of particular interest for use with self-propelling water craft wherein the floating bodies are allowed to revolve freely without any direct drive by a power unit.

Obviously, such triangular cross-sectional outlines for the grooves separating the flanges which have been described by way of example and by no means in a limiting sense should not be considered as excluding other outlines which may be preferred in certain cases. However, according to the invention, the height of said triangular outline should form about 30 to 35% of the diameter of the floating body whereas the breadth to be given to said triangular outline may reach 50% of the maximum diameter of the floating body.

Each end of the helical floating body is given a streamline shape and thus said ends form spherical caps 1d extending into a frusto-conical section 1e of a suitable slope, with a view to ensuring its connection along a matching sloping angle with the helical flanges. Said spirally deformed helical outlines extend over one revolution starting from the beginning of the helical flange before reaching the maximum diameter of the latter. The diameter of the flange increases gradually over said spirally deformed helical area, but its breadth is obtained at the very beginning and remains constant and uniform throughout the extent of the helical-spiral and helical expansion of the flange.

Axially, the floating body 1 is carried by a shaft 2 rigid with it. However, the floating body 1 may be formed directly so as to have at each end a cylindrical bearing surface which allows its positioning in corresponding bearings.

It will be readily understood that the helical floating body according to the invention may serve for water craft of any type adapted for sea or river transportation, either for individual or for public conveyances.

The water craft equipped with my improved helical floating body may include only one or several such bodies fitted in a frame in parallel alignment. The floating bodies arranged in parallelism are given preferably pitches of opposite directions, so as correct the directional drift ascribable to each of them. Said correction may however be operated in the case of bodies with pitches of the same direction by a rudder or a drop keel.

FIGS. 6 and 7 illustrate the fitting of floating bodies of the type disclosed on a water craft given by way of example and by no means in a limiting sense. In such an arrangement, two helical floating bodies 1 are fitted in parallel between two girders B carrying bearings or roller bearings in which the ends of the shaft 2 are engaged. The girders B are secured in any suitable manner to the lower section of the upper part of a ship or like water craft as illustrated diagrammatically at E. Furthermore, there are provided advantageously on each side of the hull and above the entrance platforms 3 which also protect against the projection of water produced by the rotation of the floating body. Said platforms which may be constructed in any suitable manner are preferably of a light and sturdy structure. They extend slightly beyond the outer outline of the water craft and an edging of semi-rigid material 4 covers the outer ridge so as to form thus a shock absorber protecting the craft.

Furthermore, said platforms 3 have in the longitudinal direction of progression of the craft, an angle of incidence $x$ which, for example, may be equal to 1 to 2° with reference to the horizontal axis of the floating unit. Such an angle may reduce slightly the draught when the craft is running at full speed and the resistance of air and the projection of water on said platforms, which leads to a rising tendency for the craft, which is the desired effect. Obviously the water craft may show, according to its length, one or more successive platforms arranged in a similar manner.

On the other hand, the helical floating bodies are adapted to revolve freely in the case of sailing boats, trailed crafts or outboard motor boats, or the like, or else the helical floating body or bodies are directly driven in rotation at speeds ranging between 120 and 800 r.p.m. through any suitable motor or mechanical means. In this second case, the driving means may be associated with a change speed gear, as already disclosed, and with one or more braking systems or the like auxiliaries. It should also be remarked that for water crafts equipped with two or more floating bodies arranged in parallel alignment, as illustrated in FIG. 7, it is possible to resort to floating bodies of a single type and only their direction of rotation is reversed from one alignment to the next.

It is also possible to insert fluidtight partitions 5 shown in interrupted lines in FIGS. 1 and 2 either perpendicularly or with a suitable slope with reference to the longitudinal axis 2. The floating body may include one or more partitions and preferably two fluidtight partitions located in the empty cylindrical spaces left free by the flanges in the central part of the floating body, which partitions internally subdivide said floating body into separate fluidtight compartments. Thus, if the floating body is damaged at any point, the water cannot flood the body throughout, so that the buoyancy of the arrangement is by no means jeopardized. On the other hand, and with a view to improving the reliability and non-sinkable character of the craft, the hull or body work may also be constructed in a fluidtight manner.

In the embodiment illustrated as a modification in FIGS. 8 to 12, the rotary helical body designated generally by the reference number 6 is primarily characterized by the following size ratios given with reference to the same outer maximum diameter D mentioned hereinabove, which forms the basic figure.

The total length Lr is between $D \times 5.2$ and $D \times 5.3$. Consequently, a reduced length is obtained for a same diameter D or possibly a slightly larger diameter is obtained for a same length.

The breadth $l$ of each flange measured along a generating line passing through the end of the maximum diameter D is given by the relationships: $l = D \times 1.16$ to $l = D \times 1.20$.

The spacing $e$ between two flanges measured along a generating line defined by the end of the outer diameter D is substantially equal to one half the breadth $l$, so that the following equation is substantially true: $e = l/2$.

The pitch P of the helical flanges is obtained by multiplying the diameter D by 3.5 to 3.6 which means that D varies between $D \times 3.5$ and $D \times 3.6$.

The height H of the draught under normal load conditions is substantially equal to one quarter of the diameter D, that is $H = D/4$.

As a consequence of such modified size relationships, the floating body is shorter proportionally when referred to the diameter D than in the case of the first embodiment. Such bodies are both sturdier and lighter for a same thickness. It should be reminded, in fact, that according to the above definition, it is preferred for the rotary helical floating bodies to be hollow and made of any suitable material showing the required properties. However, the invention also includes the possibility in certain cases of producing floating bodies which are solid throughout and are made of a light material which are sufficiently resistant, for instance polyurethane covered by a peripheral protecting coat.

It should also be remarked that the chassis of the water craft provided with rotary helical floating bodies according to the last-mentioned embodiment is also shorter, lighter and sturdier.

On the other hand, for the same angle given to the helical flanges, the pitch P is proportionally slightly larger and consequently the speed obtained will be higher for a same number of revolutions with a reduction in the tangential resistance produced.

The groove formed between successive flanges is constituted by the sides of the flanges $lc$, $lc'$, or $lc$, $lc''$, the side $lc'$ or $lc''$ being the side which is perpendicular or substantially perpendicular to the general axis of the floating body, while the side $lc$ is the oblique side forming an angle $\alpha$ with the side $lc$. According to a particular arrangement, the groove formed between successive flanges is larger in the areas near the ends of the floating body, as clearly shown in FIG. 11, so as to further the engagement of the floating body in the mass of water near its front end, a throttling of the liquid stream and a braking of the rear end being excluded.

From this standpoint, it should also be mentioned that the arrangement provided for the outline given cross-sectionally to the groove G between the flanges in the embodiment considered now is of considerable interest, said cross-sectional outline being approximately in the shape of a right-angled triangle, one side $1c'$ or $1c''$ of said triangular outline being perpendicular to the axis of the floating body and being substantially aligned with a point of said axle, as illustrated. The side $1c'$ or $1c''$ forms respectively the front side or the rear side of a flange, according to the direction of progression of the floating body and as to whether the latter moves freely or is propelled. Said shape given to the groove and the arrangement of its sides ensures an excellent engagement of the floating body in the mass of water and reduces the skidding or slip.

FIG. 12 illustrates an arrangement of two similar helical floating bodies 1 arranged in accordance with the last-mentioned modification. Said floating bodies are fitted in alignment and are intended chiefly for large water craft. The driving power unit M is fitted for instance between the two floating bodies, so as to drive the common shaft thereof.

The last-mentioned embodiment is particularly interesting by reason of the advantageous proportions provided for it.

What I claim is:

1. A rotary floating member for a water craft, said member comprising a hollow helicoidal winding having adjacent turns connected together to define a hollow self-contained monolithic body of generally cylindrical shape with closed ends and an enclosed interior space which is continuous within the bounds of the helicoidal winding, said winding having an outer flat surface of substantial extent in the longitudinal direction of the body which is uniform throughout the length of the body.

2. A member as claimed in claimed 1 wherein the total length of said flat surface of the winding in the longitudinal direction is between 45 and 55% of the overall length of said body.

3. A member as claimed in claim 1 wherein the ratio between the overall length of the body and the maximum diameter defined by the outer surfaces of said winding is between 6 and 7.

4. A member as claimed in claim 1 wherein adjacent turns of the winding have a pitch which ranges between 2.8 and 4 times the maximum diameter of the body, the winding being wound spirally inwards at the ends of the body over the length of at least one pitch to merge with said closed ends.

5. A member as claimed in claim 1 wherein adjacent turns of the winding define V-shaped grooves therebetween.

6. A member as claimed in claim 5 wherein the distance between adjacent turns at the outer surface of the body is about 50% of the maximum diameter of the body as defined by the outer surfaces of said winding, and the height of said groove is about 30 to 35% of said maximum diameter.

7. A member as claimed in claim 5 wherein said winding has surfaces extending inwardly from said outer flat surface to form said V-shaped grooves between adjacent turns, such surfaces having different slopes with reference to the longitudinal axis of the body.

8. A member as claimed in claim 5 wherein said winding has surfaces extending inwardly from said outer flat surface to form said V-shaped grooves between adjacent turns, such surfaces having equal depths.

9. A member as claimed in claim 5 wherein said winding has surfaces extending inwardly from said outer flat surface to form said V-shaped grooves between adjacent turns, one of such surfaces extending perpendicular to the outer flat surface of the winding.

10. A member as claimed in claim 1 intended for use with high speed water craft, wherein the overall length of said body is equal to between 5.2 and 5.3 times the maximum outer diameter thereof, the length of the flat surface of the winding in the longitudinal direction being equal to between 1.16 and 1.20 times said outer diameter, the flat surfaces of adjacent turns of the winding being spaced by a distance equal to about one-half the aforesaid length of the flat surface, the aforesaid space being constituted as a groove one bounding surface of which extends perpendicular to said flat surface a distance equal to said maximum diameter divided by a value between 3 and 3.1, the pitch of said winding being equal to the product of said outer diameter by a value between 3.5 and 3.6, the draught of the floating member under normal load being equal to about one quarter of said maximum diameter.

11. A member as claimed in claim 9 wherein the other of said surfaces forming the V-shaped groove has an obliquity with reference to the axis of said body which is larger for the turns nearer the ends of the body.

12. A member as claimed in claim 1 wherein said body is made of metal.

13. A member as claimed in claim 1 wherein said body is made of plastic.

14. A member as claimed in claim 1 wherein said body is constituted by an inflatable casing.

15. A water craft comprising at least one longitudinal shaft, front and a rear floating members of generally cylindrical shape carried coaxially by each shaft, each member having ends with terminating streamlined portions and including a helicoidal winding between said ends having adjacent turns connected together to define a hollow self-contained monolithic body of said generally cylindrical shape in which is enclosed an interior space which is continuous within the bounds of the helicoidal winding, said winding having an outer flat surface of substantial extent in the longitudinal direction of the body which is uniform throughout the length of the body, said helicoidal winding being wound spirally inwards at the ends of the body and merging with said streamlined portions, and a structure carried by the shafts.

16. A water craft as claimed in claim 15 including at least one shock absorbing platform forming a screen against the projection of water by said members, said platform being secured to said structure above the floating members.

17. A water craft as claimed in claim 14 including at least two parallel longitudinal shafts and two shock absorbing platforms forming screens against projection of water by said floating members, said platform being secured to said structure above the corresponding front and rear floating members on the two shafts, said platforms extending with a small angle of incidence with reference to the longitudinal axes of the floating members.

18. A water craft as claimed in claim 14 including a common power unit carried by each shaft and driving both floating members thereon in rotation.

19. A water craft as claimed in claim 14 wherein the floating members are mounted on said structure to revolve freely with respect thereto.

20. A member as claimed in claim 1 comprising at least one partition within said body subdividing it into fluid-tight separated compartments.

21. A member as claimed in claim 1 comprising narrow outwardly projecting fins of triangular cross-section extending along the medial sections of the outer surface of the helicoidal winding of the floating member.

References Cited

UNITED STATES PATENTS

| | | | |
|---|---|---|---|
| 53,316 | 3/1866 | Masnata | 170—157 |
| 1,372,749 | 3/1921 | Hafstrom | 115—19 XR |
| 1,748,408 | 2/1930 | Bridwell | 115—19 |
| 2,388,711 | 11/1945 | Sawyer | 115—19 |
| 3,233,574 | 2/1966 | Justinien | 115—19 |
| 3,381,650 | 5/1968 | Itoh et al. | 115—1 |

ANDREW H. FARRELL, *Primary Examiner.*

U.S. Cl. X.R.

115—1